(12) United States Patent
Lin et al.

(10) Patent No.: US 8,085,027 B2
(45) Date of Patent: Dec. 27, 2011

(54) QUASI-RESONANT SYSTEMS AND METHODS WITH MULTI-MODE CONTROL

(75) Inventors: Yuan Lin, Shanghai (CN); Jun Ye, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 206 days.

(21) Appl. No.: 12/409,287

(22) Filed: Mar. 23, 2009

(65) Prior Publication Data

US 2010/0219802 A1    Sep. 2, 2010

(30) Foreign Application Priority Data

Mar. 2, 2009   (CN) .......................... 2009 1 0047112

(51) Int. Cl.
*G05F 5/00* (2006.01)
(52) U.S. Cl. ......................... 323/300; 323/301
(58) Field of Classification Search ........... 323/299–303
See application file for complete search history.

(56) References Cited

U.S. PATENT DOCUMENTS

| | | | |
|---|---|---|---|
| 5,850,137 A * | 12/1998 | Takimoto et al. ............ | 320/164 |
| 6,944,034 B1 * | 9/2005 | Shteynberg et al. ....... | 363/21.13 |
| 7,518,889 B2 * | 4/2009 | Baurle et al. ............... | 363/21.12 |
| 7,688,041 B2 * | 3/2010 | Ng ................................ | 323/207 |
| 7,855,540 B2 * | 12/2010 | Matthews ..................... | 323/284 |
| 2007/0183170 A1 * | 8/2007 | Nakahori ........................ | 363/17 |
| 2008/0225563 A1 * | 9/2008 | Seo ................................ | 363/123 |
| 2009/0009148 A1 * | 1/2009 | Philbrick ...................... | 323/282 |
| 2009/0073725 A1 * | 3/2009 | Lin ................................ | 363/19 |
| 2009/0091955 A1 * | 4/2009 | Choi et al. ..................... | 363/37 |
| 2009/0184699 A1 * | 7/2009 | Natsume et al. .............. | 323/282 |
| 2009/0257257 A1 * | 10/2009 | Adragna et al. ................ | 363/65 |

* cited by examiner

*Primary Examiner* — Monica Lewis
*Assistant Examiner* — Jeffrey Gblende
(74) *Attorney, Agent, or Firm* — Jones Day

(57) ABSTRACT

Switch-mode power conversion system and method thereof. The switch-mode power conversion system includes a primary winding configured to receive an input voltage, and a secondary winding coupled to the primary winding and configured to, with one or more other components, generate an output signal. Additionally, the switch-mode power conversion system includes a feedback component configured to receive the output signal and generate a feedback signal based on at least information associated with the output signal, and a voltage detector configured to receive the input voltage and output a detection signal. Moreover, the switch-mode power conversion system includes a mode controller configured to receive the detection signal and the feedback signal and generate a switch signal based on at least information associated with the detection signal and the feedback signal, and a switch configured to receive the switch signal and affect a first current flowing through the primary winding.

27 Claims, 10 Drawing Sheets

QUASI-RESONANT SYSTEMS AND METHODS WITH MULTI-MODE CONTROL

1. CROSS-REFERENCES TO RELATED APPLICATIONS

This application claims priority to Chinese Patent Application No. 200910047112.1, filed Mar. 2, 2009, commonly assigned, incorporated by reference herein for all purposes.

2. BACKGROUND OF THE INVENTION

The present invention is directed to quasi-resonant (QR) systems. More particularly, the invention provides dual-mode QR systems and methods that are used for electronic devices. Merely by way of example, the invention has been applied to controllers of switch-mode power converters, such as flyback switch-mode power converters. But it would be recognized that the invention has a much broader range of applicability. For example, the present invention can be applied to devices other than integrated circuits. In another example, the present invention is applicable to any power conversion systems that use QR control.

The quasi-resonant (QR) technology has been widely used in power converters for medium and high power levels. These power converters often include various control topologies, such as the flyback topology. A conventional QR system may enable Zero-Voltage-Switching (ZVS), which is important for many high-power applications. Additionally, the conventional QR system can reduce the number of external devices by utilizing parasitic devices.

FIG. 1 is a simplified diagram showing a conventional flyback pulse-width-modulated (PWM) system with QR control. The flyback PWM system 100 with QR control includes an auxiliary winding to generate a demagnetization signal DEM for a QR controller. For example, the DEM signal indicates the demagnetization of a power transformer T as shown in FIG. 1. Additionally, the system 100 also includes one or more components for generating a DC input voltage Vin. The DC input voltage Vin may be a rectified line voltage or the output of a power-factor-correction (PFC) stage. For example, the PFC stage is placed between a diode bridge and a DC-to-DC converter for certain high-power applications. Such high-power applications may include flyback power converters with QR control and/or forward power converters with QR control.

As shown in FIG. 1, the flyback PWM system 100 is associated with a combination of Lleak and Cp. Lleak is the leakage part of the primary inductance Lm, and Cp is the parasitic capacitance at the drain of the MOSFET S1.

FIG. 2 is a simplified diagram showing operation mechanism of a conventional flyback pulse-width-modulated (PWM) system with QR control. For example, the conventional flyback pulse-width-modulated (PWM) system is the system 100.

As shown in FIG. 2, at t0, the PWM switching is enabled. The power MOSFET S1 (as shown in FIG. 1) is turned on. Consequently, the current of the primary inductor ramps up, and the power transformer T stores energy.

At t1, the current of the primary inductor ramps up to a value that is determined by the feedback. The power MOSFET S1 is turned off. The drain-to-source voltage Vds of the MOSFET S1 rises rapidly because of the transformer current. The peak value of the drain-to-source voltage Vds is determined by the leakage inductance Lleak, the DC input voltage Vin, and the reflected output voltage Vr. Vr is equal to N×Vout, as shown in FIG. 1.

At t2, the demagnetization of the leakage inductance Lleak is completed, and the primary inductance Lm (as shown in FIG. 1) begins to demagnetize.

At t3, the demagnetization of the primary inductance Lm ends, and the damping resonance starts. The resonance period equals 2×Tv, which is determined by Lm and Cp. As shown in FIG. 2, the resonance often generates one or more valleys. For example, the first valley occurs at t4, and the second valley occurs at t5.

At one of these valleys, a new PWM cycle is restarted by the QR controller. If the new PWM cycle is started at the first valley at t4, the QR controller operates in the QR mode. If the new PWM cycle is started at a subsequent valley, such as the second valley at t5, the QR controller operates in the QR foldback mode.

Since at these valleys, Vds equals zero or a local minimum, the efficiency of the system is improved. For example, the first valley at t4 often is selected because this valley corresponds to the smallest local minimum.

The conventional flyback PWM system 100 with QR control has the following characteristics in comparison with a conventional flyback PWM system with fixed frequency:

(a) Improved EMI performance. Without a PFC stage, the switching frequency of the system 100 can be modulated at twice the line frequency due to the ripple across the input bulk capacitor. The depth of the modulation also depends on the ripple magnitude. Hence the spectrum spreads over one or more frequency bands, rather than being concentrated on single frequency values. It is then possible to reduce the size and cost of the EMI filter.

(b) Improved power efficiency. For example, the system 100 can substantially achieve zero voltage switching (ZVS); therefore the power efficiency of the system 100 is improved.

(c) Inherent short circuit protection. For example, the conduction cycles of the power MOSFET are inhibited until the transformer is full demagnetized; hence the transformer saturation is not possible. In another example, during a short circuit, the demagnetization voltage is very low; hence the system operates at a low frequency with a small duty cycle. As a result, the power delivered by the converter is also low.

FIG. 3 is a simplified diagram showing a conventional flyback PWM system including a conventional QR controller. As shown in FIG. 3, the flyback system 300 includes a QR controller 310. The controller 310 includes a flip-flop block, a UVLO&POR block, a DEM block, a PWM generator block, and an LEB&OCP block. For example, the UVLO&POR block can provide power supply to a control IC, and the DEM block can detect demagnetization of the transformer T1 and trigger a new PWM cycle. The PWM generator block can control the peak primary current. The LEB&OCP block is used for leading edge blanking and over current protection. As shown in FIG. 3, the auxiliary winding can provide not only the power but also the DEM signal to IC.

The conventional techniques of flyback PWM systems with QR control may be costly and large in size. Hence it is highly desirable to improve techniques that are related to QR control.

3. BRIEF SUMMARY OF THE INVENTION

The present invention is directed to quasi-resonant (QR) systems. More particularly, the invention provides dual-mode QR systems and methods that are used for electronic devices. Merely by way of example, the invention has been applied to controllers of switch-mode power converters, such as flyback switch-mode power converters. But it would be recognized that the invention has a much broader range of applicability.

For example, the present invention can be applied to devices other than integrated circuits. In another example, the present invention is applicable to any power conversion systems that use QR control.

According to one embodiment of the present invention, a switch-mode power conversion system includes a primary winding configured to receive an input voltage, and a secondary winding coupled to the primary winding and configured to, with one or more other components, generate an output signal. Additionally, the switch-mode power conversion system includes a feedback component configured to receive the output signal and generate a feedback signal based on at least information associated with the output signal, and a voltage detector configured to receive the input voltage and output a detection signal. Moreover, the switch-mode power conversion system includes a mode controller configured to receive the detection signal and the feedback signal and generate a switch signal based on at least information associated with the detection signal and the feedback signal, and a switch configured to receive the switch signal and affect a first current flowing through the primary winding. The mode controller is further configured to process information associated with the detection signal and a first threshold, determine whether the detection signal and the first threshold satisfy a first predetermined criterion, process information associated with the feedback signal and a second threshold, determine whether the feedback signal and the second threshold satisfy a second predetermined criterion, and determine whether an operation mode for the switch-mode power conversion system is a quasi-resonant mode based on at least whether the first predetermined criterion is determined to be satisfied and whether the second predetermined criterion is determined to be satisfied. Also, the switch signal corresponds to the operation mode for the switch-mode power conversion system.

According to another embodiment of the present invention, a switch-mode power conversion system includes a primary winding configured to receive an input voltage, and a secondary winding coupled to the primary winding and configured to, with one or more other components, generate an output signal. Additionally, the switch-mode power conversion system includes a feedback component configured to receive the output signal and generate a feedback signal based on at least information associated with the output signal, and a voltage detector configured to receive the input voltage and output a detection signal. Moreover, the switch-mode power conversion system includes a first mode controller configured to receive the detection signal and the feedback signal and generate a switch signal based on at least information associated with the detection signal and the feedback signal, and a switch configured to receive the switch signal and affect a first current flowing through the primary winding. The first mode controller includes at least a mode selection component and a quasi-resonant mode controller. The mode selection component is configured to process information associated with the detection signal and a first threshold, determine whether the detection signal and the first threshold satisfy a first predetermined criterion, process information associated with the feedback signal and a second threshold, determine whether the feedback signal and the second threshold satisfy a second predetermined criterion, and determine whether an operation mode for the switch-mode power conversion system is a quasi-resonant mode based on at least whether the first predetermined criterion is determined to be satisfied and whether the second predetermined criterion is determined to be satisfied. Additionally, the mode selection component is further configured to, if the operation mode is determined to be the quasi-resonant mode, send a mode selection signal to the quasi-resonant mode controller to generate the switch signal corresponding to the quasi-resonant mode.

According to yet another embodiment of the present invention, a method for determining an operation mode for a switch-mode power conversion system includes receiving an input voltage by a primary winding and a voltage detector, and generating a detection signal by the voltage detector based on at least information associated with the input voltage. Additionally, the method includes generating an output signal based on at least information associated with the input voltage, receiving the output signal by a feedback component, and generating a feedback signal based on at least information associated with the output signal. Moreover, the method includes receiving the detection signal and the feedback signal by a mode controller, generating a switch signal based on at least information associated with the detection signal and the feedback signal, and affecting a first current flowing through the primary winding based on at least information associated with the switch signal. The process for generating a switch signal based on at least information associated with the detection signal and the feedback signal includes processing information associated with the detection signal and a first threshold, determining whether the detection signal and the first threshold satisfy a first predetermined criterion, processing information associated with the feedback signal and a second threshold, determining whether the feedback signal and the second threshold satisfy a second predetermined criterion, and determining whether an operation mode for the switch-mode power conversion system is a quasi-resonant mode based on at least whether the first predetermined criterion is determined to be satisfied and whether the second predetermined criterion is determined to be satisfied. The switch signal corresponds to the operation mode for the switch-mode power conversion system.

Many benefits are achieved by way of the present invention over conventional techniques. Certain embodiments of the present invention significantly reduce frequency variations. Some embodiments of the present invention significantly simplify transformer designs.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to quasi-resonant (QR) systems. More particularly, the invention provides dual-mode QR systems and methods that are used for electronic devices. Merely by way of example, the invention has been applied to controllers of switch-mode power converters, such as flyback switch-mode power converters. But it would be recognized that the invention has a much broader range of applicability. For example, the present invention can be applied to devices other than integrated circuits. In another example, the present invention is applicable to any power conversion systems that use QR control.

Figure 2:
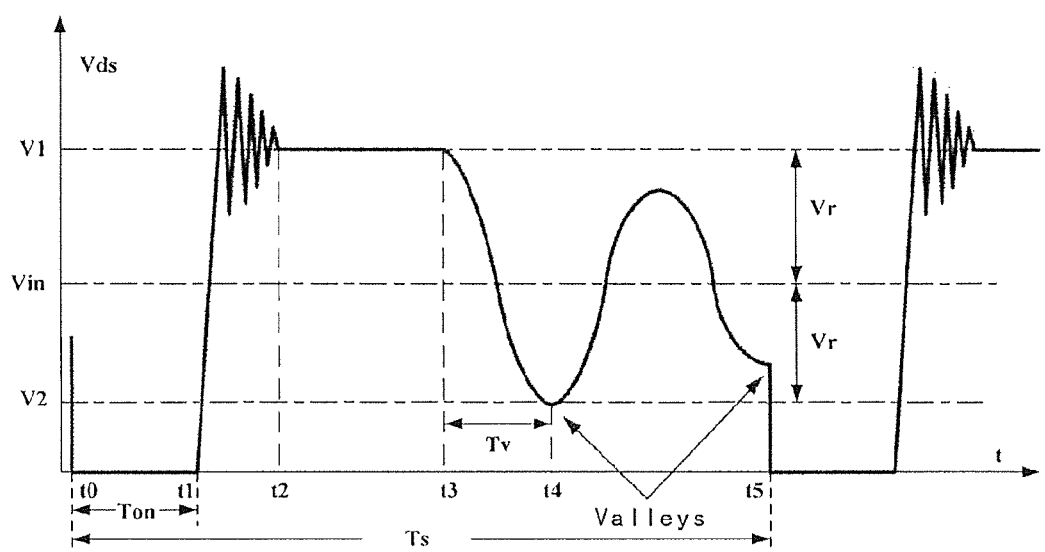
FIG. 2 is a simplified diagram showing operation mechanism of a conventional flyback pulse-width-modulated (PWM) system with QR control.

The conventional techniques have significant drawbacks. For example, if the first valley at t4 is selected to start the new PWM cycle and if Tv is very small in comparison with Ts, the conventional flyback PWM system with QR control may operate under a transition mode, i.e., the CCM/DCM boundary mode, as shown in FIG. 2. Specifically, Tv is a time period from t0 to t5, and Ts is a time period from t3 to t4.

Figure 1:
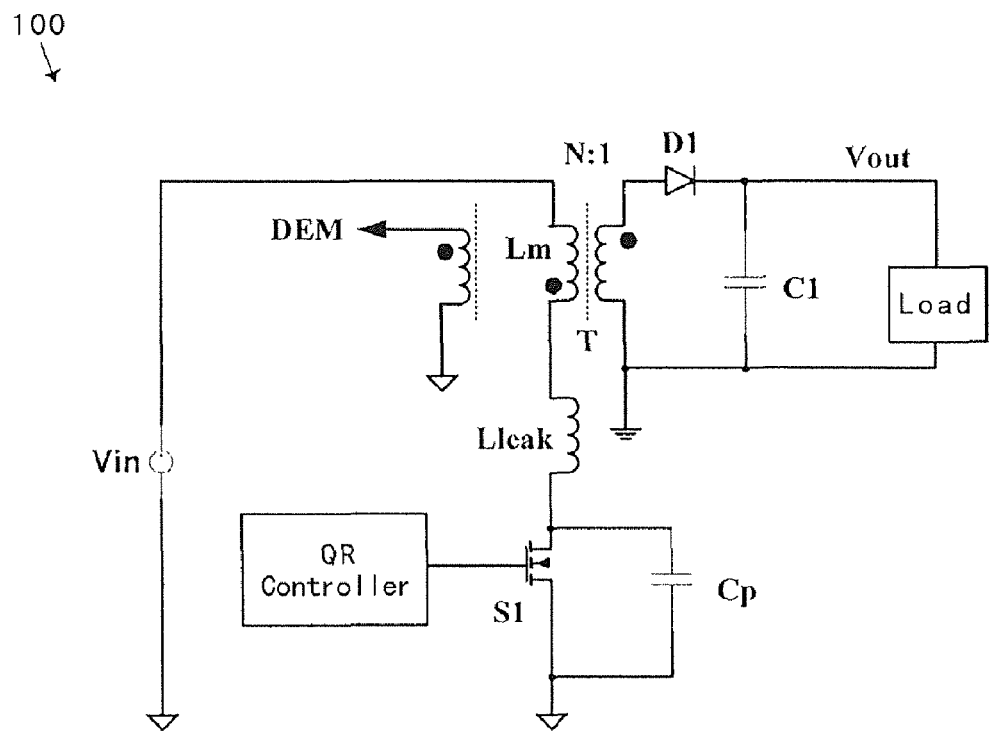
FIG. 1 is a simplified diagram showing a conventional flyback pulse-width-modulated (PWM) system with QR control.
Figure 3:
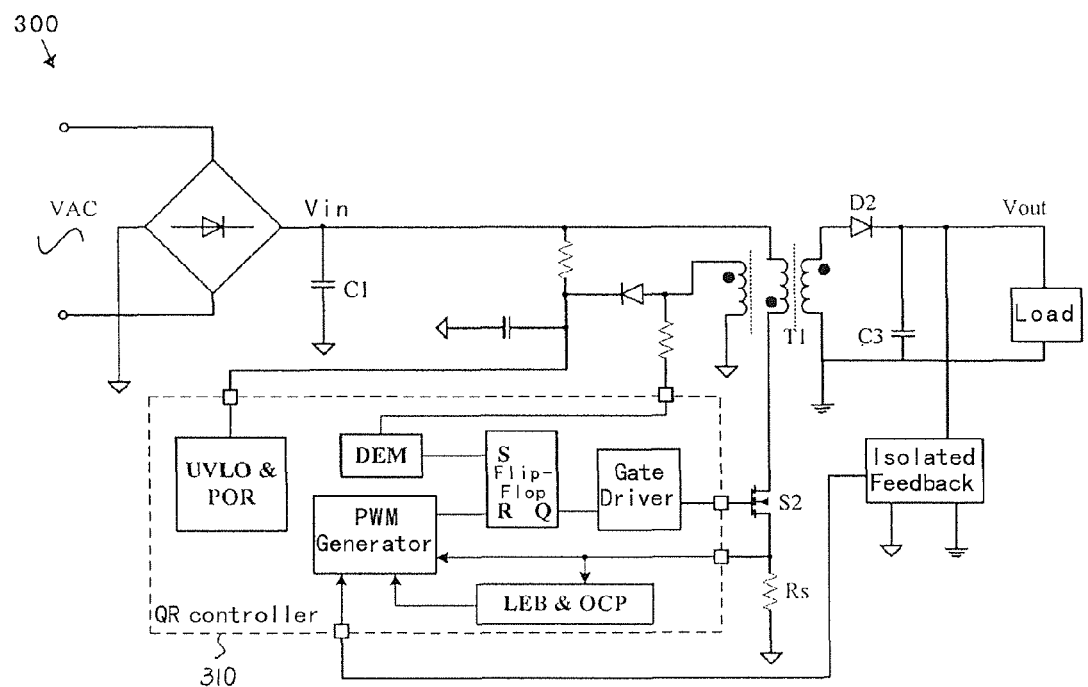
FIG. 3 is a simplified diagram showing a conventional flyback system including a conventional QR controller.

For conventional flyback PWM systems as shown in FIGS. 1, 2, and 3, the duty cycle is determined by turn ratio, input voltage, and output voltage, as follows.

$$D = \frac{nV_{out}}{V_{in} + nV_{out}} \quad (1)$$

where $V_{out}$ is the output voltage, $V_{in}$ is the input voltage, D is duty cycle, and n is transformer turn ratio of the primary winding to the secondary winding. Additionally, D is equal to Ton/(Ton+Toff). Hence the power transfer equation can be expressed by $$P_0 = \frac{1}{2} L_m I_{pk}^2 f_S = \frac{1}{2} L_m \left( \frac{V_{in}}{L_m} DT_S \right)^2 f_S \quad (2)$$

where $L_m$ is the primary inductance, $f_S$ is the switching frequency, $I_{pk}$ is the primary peak current in a switching cycle, and $P_0$ is the output power. Additionally, $f_S$ is equal to 1/(Ton+Toff). Therefore, $f_S$ can be expressed by $$f_S = \frac{V_{in}^2}{2LP_0} D^2 = \frac{1}{2LP_0} \left( \frac{nV_{out}}{1 + \frac{nV_{out}}{V_{in}}} \right) \quad (3)$$

As shown by Equation 3, the conventional flyback PWM system with QR control has a varying switching frequency.

The frequency $f_S$ is related to the input voltage $V_{in}$, the output power $P_0$, and the output voltage $V_{out}$.

Figure 4:
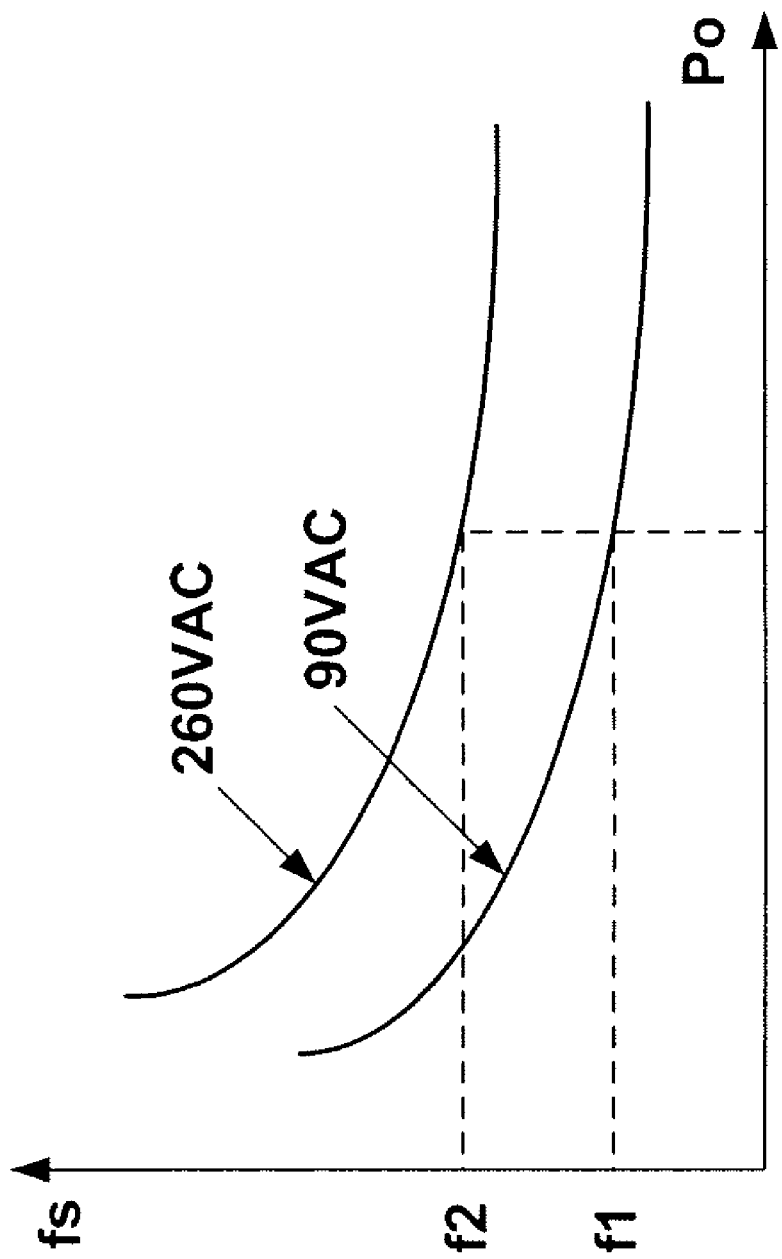
FIG. 4 is a simplified diagram showing switching frequency as a function of $P_O$ at $V_{in}$ equal to 90V AC and equal to 260V AC for a constant $V_{out}$.

FIG. 4 is a simplified diagram showing switching frequency as a function of $P_0$ at $V_{in}$ equal to 90V AC and equal to 260V AC for a constant $V_{out}$. $P_0$ represents the loading variation.

As shown in FIG. 4, the frequency ratio between $f_S$ at 260V AC and $f_S$ at 90V AC is constant at full loading range. More specifically, $$\frac{f_2}{f_1} = \left( \frac{1 + \frac{nV_{out}}{90VAC}}{1 + \frac{nV_{out}}{260VAC}} \right)^2 = const. \quad (4)$$

Figure 5:
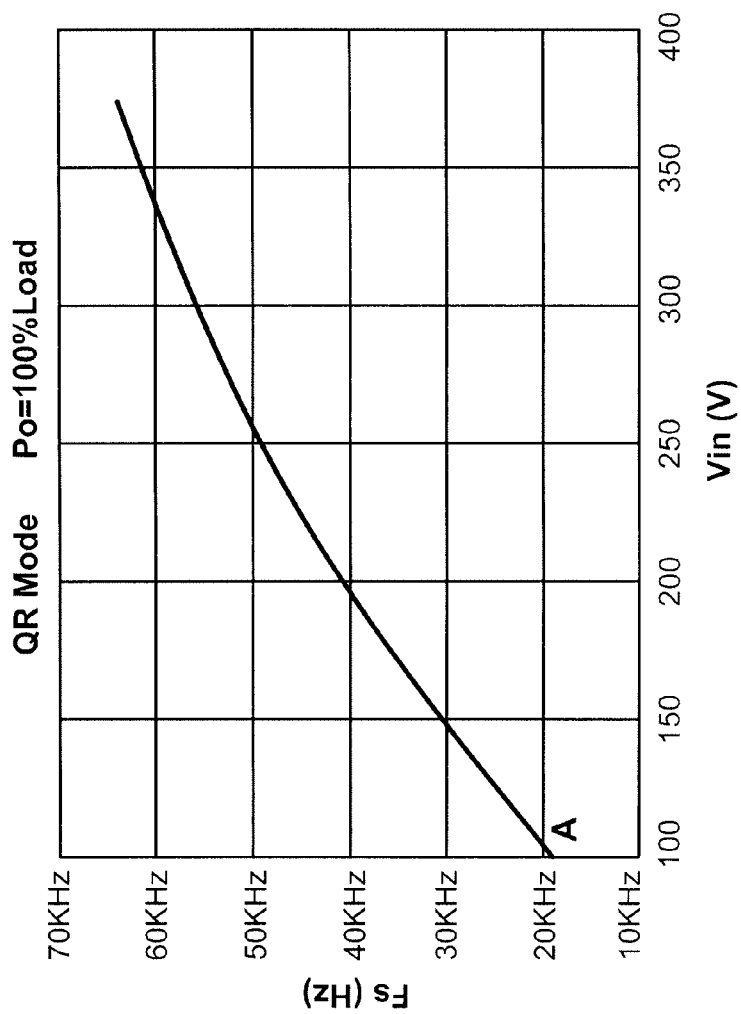
FIG. 5 is a simplified diagram showing switching frequency as a function of $V_{in}$ at full loading.

FIG. 5 is a simplified diagram showing switching frequency as a function of $V_{in}$ at full loading. As shown in FIG. 5, the range for frequency variation often is large if the diode bridge is followed directly by a conventional flyback PWM system with QR control. To take into account this frequency range, the transformer often becomes larger in size and more costly. In practice, the switching frequency cannot be too high due to EMI issues. For example, $f_S$ is limited to 130 KHz.

Figure 6:
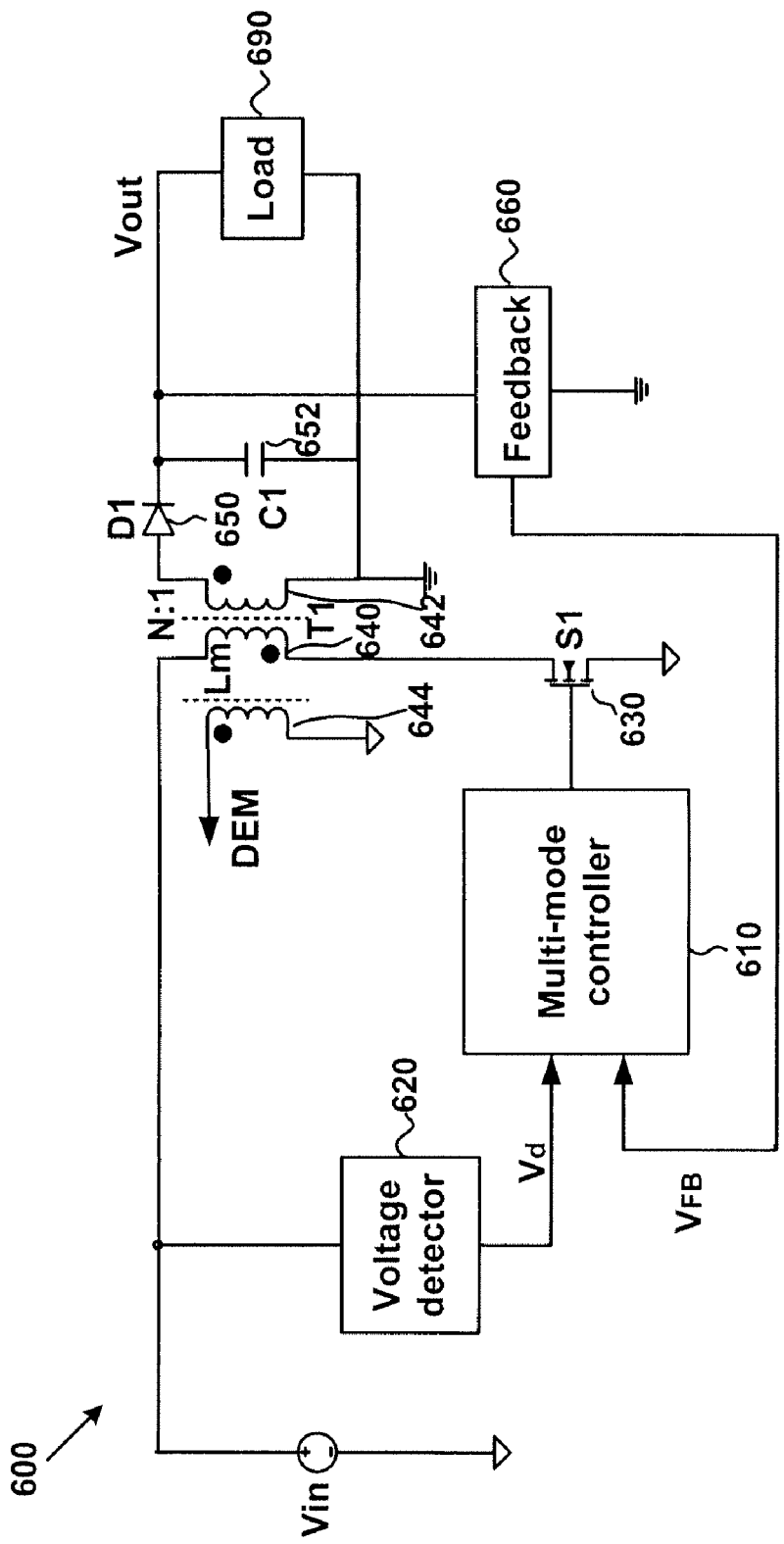
FIG. 6 is a simplified diagram showing a pulse-width-modulated (PWM) power conversion system with a multi-mode controller according to an embodiment of the present invention.

FIG. 6 is a simplified diagram showing a pulse-width-modulated (PWM) power conversion system with a multi-mode controller according to an embodiment of the present invention. This diagram is merely an example, which should not unduly limit the scope of the claims. One of ordinary skill in the art would recognize many variations, alternatives, and modifications. A system 600 includes a multi-mode controller 610, a voltage detector 620, a switch 630, a primary winding 640, a secondary winding 642, an auxiliary winding 644, a diode 650, a capacitor 652, and a feedback component 660.

The voltage detector 620 and the primary winding 640 both receive an input voltage $V_{in}$. For example, $V_{in}$ is a rectified line input voltage. In another example, the primary winding 640 corresponds to an inductance value of $L_m$. As shown in FIG. 6, the primary winding 640 forms a transformer T1 with the secondary winding 642. The transformer T1 corresponds to a turn ratio N of the primary winding 640 to the secondary winding 642. In response, the secondary winding 642, in combination with the diode 650 and the capacitor 652, generates an output voltage $V_{out}$ for a load 690. For example, the diode 650 and the capacitor 652 are the diode D1 and the capacitor C1 respectively. The output voltage $V_{out}$ is also received by the feedback component 660, which in turn generates a feedback voltage $V_{FB}$. For example, the feedback component 660 is an isolated feedback subsystem.

As shown in FIG. 6, the secondary winding 642 is coupled electromagnetically to both the primary winding 640 and the auxiliary winding 644. For example, the auxiliary winding 644 generates a demagnetization signal DEM and outputs the signal DEM to the multi-mode controller 610. Additionally, the multi-mode controller 610 receives the detection voltage $V_d$ from the voltage detector 620, and the feedback voltage $V_{FB}$ from the feedback component 660. In response, the multi-mode controller 610 determines the operation mode of the system 600 and sends the corresponding drive signal to the switch 630. For example, the control signal closes or opens the switch 630. In one embodiment, the switch 630 is a MOSFET transistor S1. If the MOSFET transistor S1 is turned on, the switch is closed. If the MOSFET transistor S1 is turned off, the switch is open.

As discussed above and further emphasized here, FIG. 6 is merely an example, which should not unduly limit the scope of the claims. One of ordinary skill in the art would recognize many variations, alternatives, and modifications. For example, the voltage detector 620 outputs a detection current $I_d$, which is received by the multi-mode controller 610. In another example, the multi-mode controller 610 and the voltage detector 620 are combined.

Figure 7:
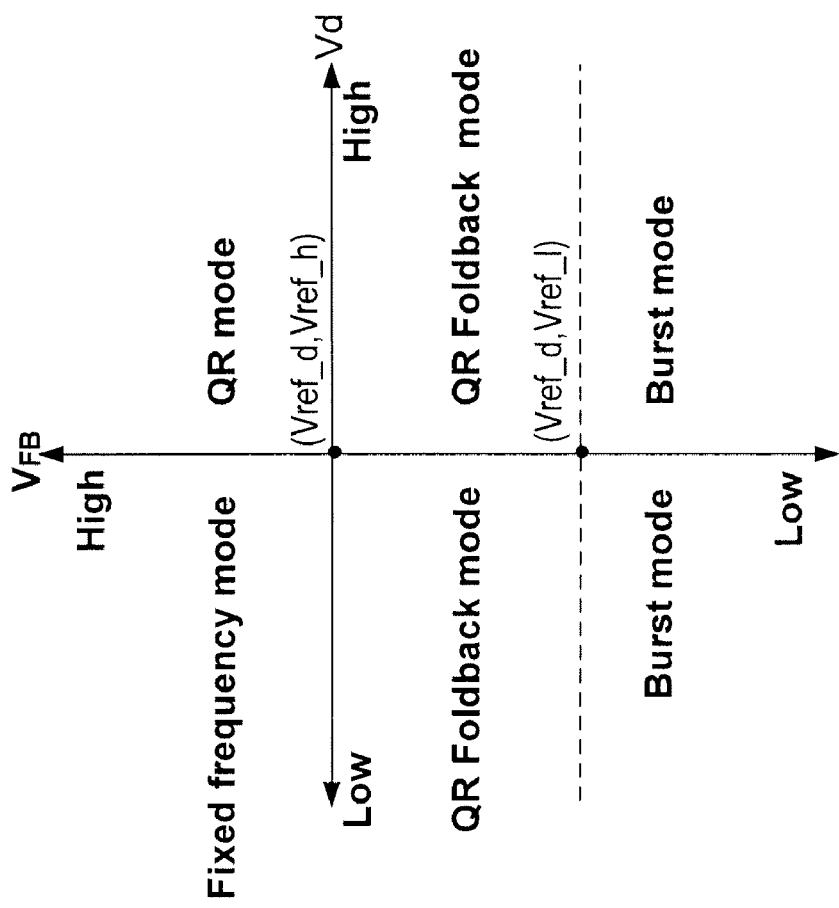
FIG. 7 is a simplified diagram showing operation modes as a function of feedback voltage and detection voltage according to an embodiment of the present invention.

FIG. 7 is a simplified diagram showing operation modes as a function of feedback voltage and detection voltage according to an embodiment of the present invention. This diagram is merely an example, which should not unduly limit the scope of the claims. One of ordinary skill in the art would recognize many variations, alternatives, and modifications.

As shown in FIG. 7, the multi-mode controller 610 uses the feedback voltage $V_{FB}$ and the detection voltage $V_d$ to achieve a two-dimensional control of the operation mode of the system 600. According to an embodiment of the present invention, the operation mode of the system 600 is determined as follows.

(a) If $V_{FB}$ is higher than a threshold $V_{ref\_h}$ and $V_d$ is higher than a threshold $V_{ref\_d}$, the multi-mode controller 610 operates in the QR mode.

(b) If $V_{FB}$ is higher than the threshold $V_{ref\_d}$ and $V_d$ is lower than the threshold $V_{ref\_d}$, the multi-mode controller 610 operates in the fixed frequency mode. For example, in the fixed frequency mode, the switching frequency is set at a predetermined value. In another example, the fixed frequency mode is a continuous current mode (CCM).

(c) If $V_{FB}$ is lower than the threshold $V_{ref\_d}$ but higher than the threshold $V_{ref\_1}$, the multi-mode controller 610 operates in the QR foldback mode. For example, the QR foldback mode is the pulse-frequency-modulated (PFM) mode or the frequency foldback mode.

(d) If $V_{FB}$ is lower than the threshold $V_{ref\_1}$, the multi-mode controller 610 operates in the burst mode. For example, in the burst mode, the multi-mode controller 610 provides a pulse or a group of pulses at a predetermined frequency. According to an embodiment, each pulse can turn on the switch 630 for a period of time.

According to one embodiment, each of $V_d$, $V_{ref\_1}$, and $V_{ref\_h}$ represents a two-level threshold. For example, each of $V_d$, $V_{ref\_1}$, and $V_{ref\_h}$ corresponds to two hysteresis threshold voltages. In another example, for the sake of simplicity, the detailed description about the hysteresis for the mode transition is omitted. For the mode transition, it is simply stated that if $V>V_{th}$, the controller lies in mode A, and if $V<V_{th}$, the controller lies in mode B. But according to one embodiment, $V_{th}$ is in fact a double-level voltage threshold. Each of $V_d$, $V_{ref\_1}$, and $V_{ref\_h}$ can noted as $V_{th}$.

According to another embodiment, if $V>V_{th}$, a controller lies in mode A and otherwise the controller lies in mode B. For example, since there is hysteresis between mode transitions, the transition threshold $V_{th}$ represents two threshold levels $V_{th\_1}$ and $V_{th\_1}$ that are close to each other in magnitude. $V_{th}$ is larger than $V_{th\_1}$ but smaller than $V_{th\_2}$. Each of $V_{th\_1}$ and $V_{th\_2}$ is a hysteresis threshold voltage. If $V<V_{th\_1}$, the controller lies in mode B, and if $V>V_{th\_2}$, the controller lies in the mode A. For $V_{th\_1}<V<V_{th\_2}$, the mode of the controller depends on the previous state.

As discussed above and further emphasized here, FIG. 7 is merely an example, which should not unduly limit the scope of the claims. One of ordinary skill in the art would recognize many variations, alternatives, and modifications. For example, the multi-mode controller 610 uses the feedback voltage $V_{FB}$ and the detection current $I_d$ or $N\times I_d$ to achieve a two-dimensional control of the operation mode of the system 600. N is a positive integer. According to one embodiment, the multi-mode controller 610 compares the detection current $I_d$ or $N\times I_d$ with the threshold $I_{ref\_d}$, instead of comparing the detection voltage $V_d$ with the threshold $V_{ref\_d}$.

According to another embodiment, regardless of whether the detection voltage $V_d$ or the detection current $I_d$ or $N\times I_d$ is used for comparison, the multi-mode controller 610 effectively compares the input voltage $V_{in}$ with a threshold $V_{ref\_in}$, because the detection voltage $V_d$ and the detection current $I_d$ each indicates the magnitude of the input voltage $V_{in}$. For example, if $V_{FB}$ is higher than the threshold $V_{ref\_h}$ and $V_{in}$ is higher than the threshold $V_{ref\_in}$, the system 610 operates in the QR mode. In another example, if $V_{FB}$ is higher than the threshold $V_{ref\_h}$ and $V_{in}$ is lower than the threshold $V_{ref\_in}$, the system 610 operates in the fixed frequency mode.

Figure 8:
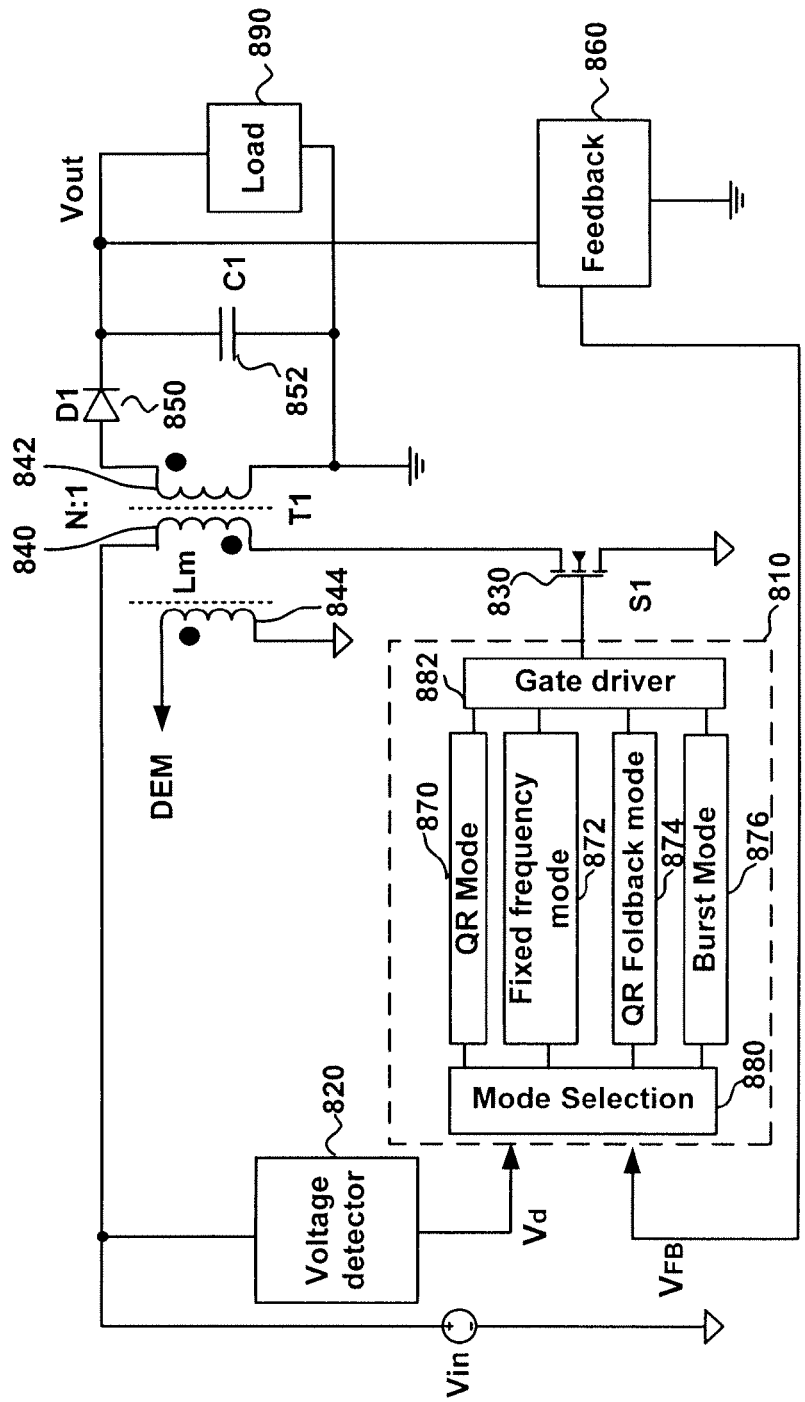
FIG. 8 is a simplified diagram showing a pulse-width-modulated (PWM) power conversion system with a multi-mode controller according to another embodiment of the present invention.

FIG. 8 is a simplified diagram showing a pulse-width-modulated (PWM) power conversion system with a multi-mode controller according to another embodiment of the present invention. This diagram is merely an example, which should not unduly limit the scope of the claims. One of ordinary skill in the art would recognize many variations, alternatives, and modifications. A system 800 includes a multi-mode controller 810, a voltage detector 820, a switch 830, a primary winding 840, a secondary winding 842, an auxiliary winding 844, a diode 850, a capacitor 852, and a feedback component 860. The multi-mode controller 810 includes a mode selection component 880, a QR mode controller 870, a fixed frequency mode 872, a QR foldback mode controller 874, a burse mode controller 876, and a gate driver 882.

According to one embodiment, the system 800 is the same as the system 600. For example, the multi-mode controller 810, the voltage detector 820, the switch 830, the primary winding 840, the secondary winding 842, the auxiliary winding 844, the diode 850, the capacitor 852, and the feedback component 860 are the same as the multi-mode controller 610, the voltage detector 620, the switch 630, the primary winding 640, the secondary winding 642, the auxiliary winding 644, the diode 650, the capacitor 652, and the feedback component 660, respectively.

As shown in FIG. 8, the multi-mode controller 810 receives the detection voltage $V_d$ from the voltage detector 820, and the feedback voltage $V_{FB}$ from the feedback component 860. In response, the multi-mode controller 810 determines the operation mode of the system 800 and sends the corresponding drive signal to the switch 830.

For example, the mode selection component 880 receives the detection voltage $V_d$ and the feedback voltage $V_{FB}$, and selects the mode in which the system 800 should operate. According to one embodiment, the mode is chosen from QR mode, fixed frequency mode, QR foldback mode, and burst mode based on FIG. 7. According to another embodiment, the drive signal is generated as follows.

(a) If the QR mode is selected, the QR mode controller 870 outputs a control signal to the gate driver 882. In response, the gate driver 882 sends to the switch 830 a drive signal, which corresponds to the QR mode.

(b) If the fixed frequency mode is selected, the fixed frequency mode controller 872 outputs a control signal to the gate driver 882. In response, the gate driver 882 sends to the switch 830 a drive signal, which corresponds to the fixed frequency mode.

(c) If the QR foldback mode is selected, the QR foldback mode controller 874 outputs a control signal to the gate driver 882. In response, the gate driver 882 sends to the switch 830 a drive signal, which corresponds to the QR foldback mode.

(d) If the burst mode is selected, the burst mode controller 876 outputs a control signal to the gate driver 882. In response, the gate driver 882 sends to the switch 830 a drive signal, which corresponds to the burst mode.

As discussed above and further emphasized here, FIG. 8 is merely an example, which should not unduly limit the scope of the claims. One of ordinary skill in the art would recognize many variations, alternatives, and modifications. For example, the voltage detector 820 outputs a detection current $I_d$, which is received by the multi-mode controller 810.

Figure 9:
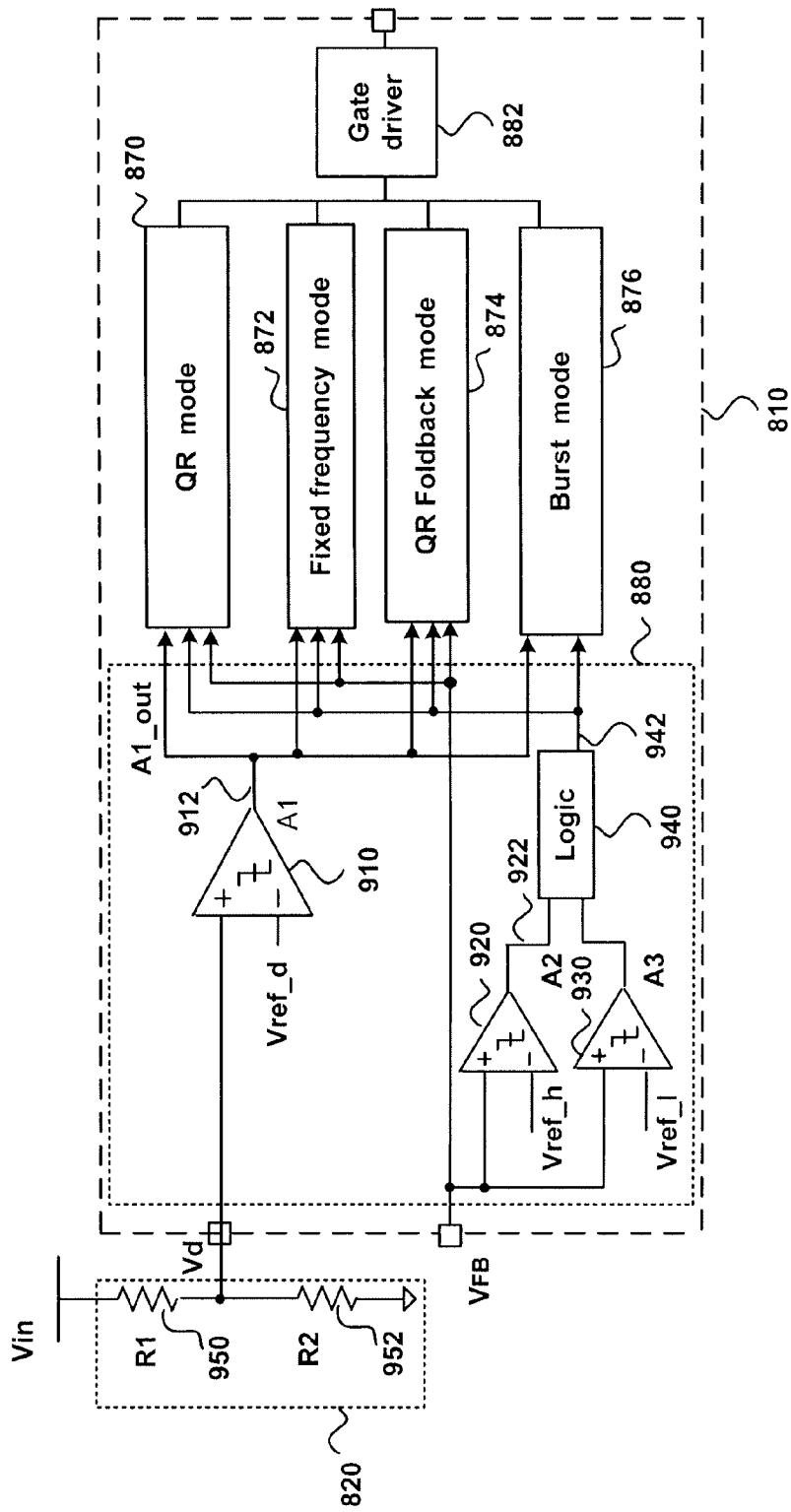
FIG. 9 is a simplified diagram showing a voltage detector and a multi-mode controller as included in a pulse-width-modulated (PWM) power conversion system according to an embodiment of the present invention.

FIG. 9 is a simplified diagram showing a voltage detector and a multi-mode controller as included in a pulse-width-modulated (PWM) power conversion system according to an embodiment of the present invention. This diagram is merely an example, which should not unduly limit the scope of the claims. One of ordinary skill in the art would recognize many variations, alternatives, and modifications.

The multi-mode controller 810 includes the mode selection component 880, the QR mode controller 870, the fixed frequency mode 872, the QR foldback mode controller 874, the burst mode controller 876, and the gate driver 882. As shown in FIG. 9, the mode selection component 880 includes voltage comparators 910, 920, and 930, and a logic component 940. The voltage comparators 910, 920, and 930 are also called voltage comparators A1, A2, and A3 respectively. Additionally, the voltage detector 820 includes resistors 950 and 952. The resistors 950 and 952 are also called resistors R1 and R2.

The voltage detector 820 includes a voltage divider formed by the resistors 950 and 952. The voltage divider receives the input voltage $V_{in}$ and generates the detection voltage $V_d$. The detection voltage $V_d$ is sent to the mode selection component 880. If the detection voltage $V_d$ is higher than the threshold $V_{ref\_d}$, the voltage comparator 910 outputs a signal 912 that would enable only the QR mode, the QR foldback mode, and the burst mode. If the detection voltage $V_d$ is lower than the threshold $V_{ref\_d}$, the voltage comparator 910 outputs the signal 912 that would enable only the fixed frequency mode, the QR foldback mode, and the burst mode.

Additionally, the mode selection component 880 also receives the feedback voltage $V_{FB}$. The feedback voltage $V_{FB}$ is compared with the threshold $V_{ref\_h}$ by the voltage comparator 920, and with the threshold $V_{ref\_1}$ by the voltage comparator 930. Both the voltage comparators 920 and 930 send their output signals to the logic component 940, which in response generates a signal 942.

If the feedback voltage $V_{FB}$ is higher than the threshold $V_{ref\_h}$, the signal 942 enables only the QR mode and the fixed frequency mode. If $V_{FB}$ is lower than the threshold $V_{ref\_h}$ but higher than the threshold $V_{ref\_1}$, the signal 942 would enable only the QR foldback mode. If $V_{FB}$ is lower than the threshold $V_{ref\_1}$, the signal 942 would enable only the burst mode.

According to an embodiment, the multi-mode controller 810 is further configured as follows.

(a) If both the signals 912 and 942 enable the QR mode, the QR mode controller 870 outputs a control signal to the gate driver 882. In response, the gate driver 882 sends to the switch 830 a drive signal, which corresponds to the QR mode. If either the signal 912 or 942 does not enable the QR mode, the QR mode controller 870 is not activated and thus the drive signal would not correspond to the QR mode.

(b) If both the signals 912 and 942 enable the fixed frequency mode, the fixed frequency mode controller 872 outputs a control signal to the gate driver 882. In response, the gate driver 882 sends to the switch 830 a drive signal, which corresponds to the fixed frequency mode. If either the signal 912 or 942 does not enable the fixed frequency mode, the fixed frequency mode controller 872 is not activated and thus the drive signal would not correspond to the fixed frequency mode.

(c) If both the signals 912 and 942 enable the QR foldback mode, the fixed frequency mode controller 874 outputs a control signal to the gate driver 882. In response, the gate driver 882 sends to the switch 830 a drive signal, which corresponds to the QR foldback mode. If either the signal 912 or 942 does not enable the QR foldback mode, the QR foldback mode controller 874 is not activated and thus the drive signal would not correspond to the QR foldback mode.

(d) If both the signals 912 and 942 enable the burst mode, the fixed frequency mode controller 876 outputs a control signal to the gate driver 882. In response, the gate driver 882 sends to the switch 830 a drive signal, which corresponds to the burst mode. If either the signal 912 or 942 does not enable the burst mode, the burst mode controller 876 is not activated and thus the drive signal would not correspond to the burst mode.

As discussed above and further emphasized here, FIG. 9 is merely an example, which should not unduly limit the scope of the claims. One of ordinary skill in the art would recognize many variations, alternatives, and modifications. For example, a capacitor is added to the voltage detector 820 in parallel with the resistor 950 or 952 to clean up the detection voltage $V_d$. In another example, some hysteresis with debounce is added to the voltage comparator 910.

Figure 10:
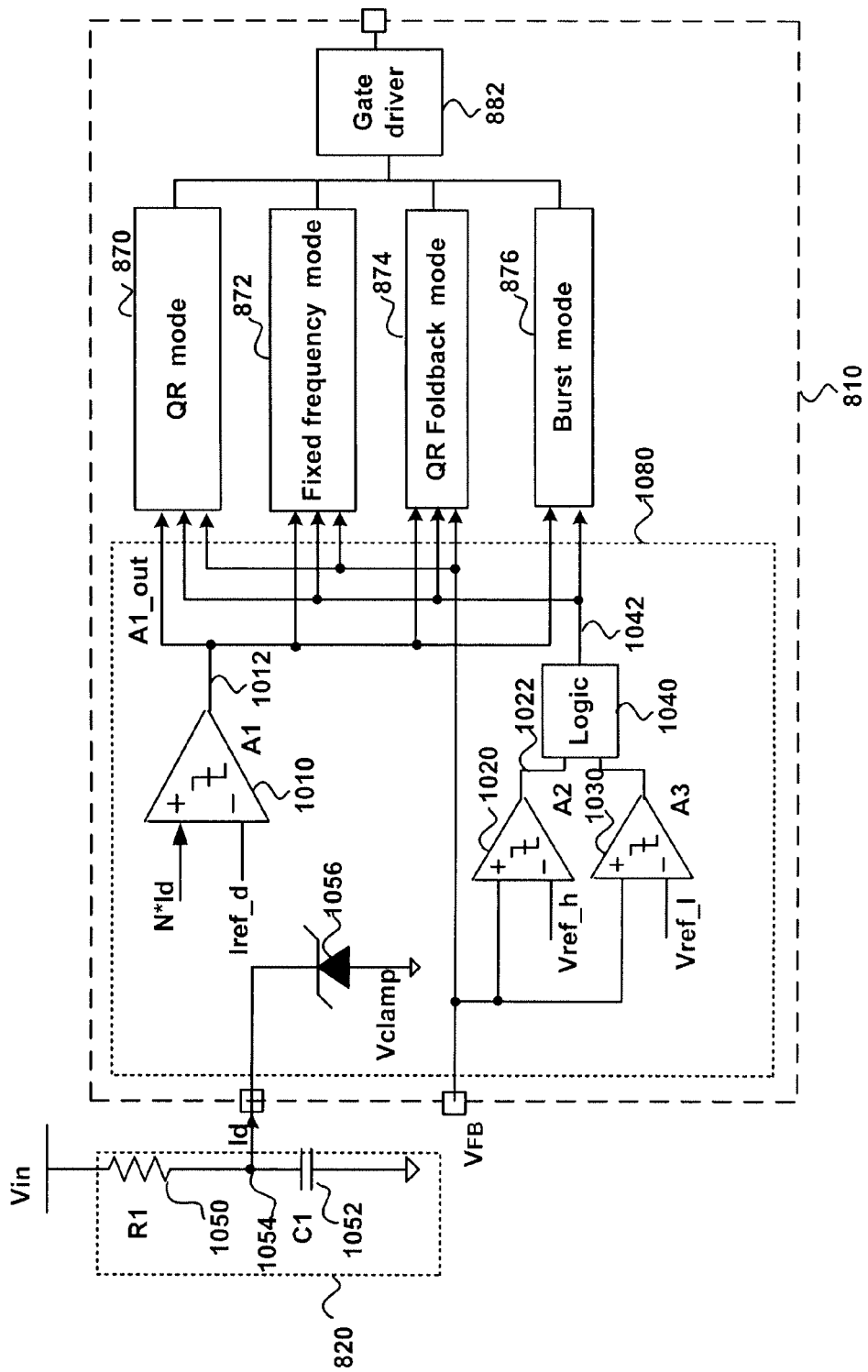
FIG. 10 is a simplified diagram showing a voltage detector and a multi-mode controller as included in a pulse-width-modulated (PWM) power conversion system according to another embodiment of the present invention.

FIG. 10 is a simplified diagram showing a voltage detector and a multi-mode controller as included in a pulse-width-modulated (PWM) power conversion system according to another embodiment of the present invention. This diagram is merely an example, which should not unduly limit the scope of the claims. One of ordinary skill in the art would recognize many variations, alternatives, and modifications.

The multi-mode controller 810 includes the mode selection component 880, the QR mode controller 870, the fixed frequency mode 872, the QR foldback mode controller 874, the burst mode controller 876, and the gate driver 882. As shown in FIG. 10, the mode selection component 880 includes current comparator 1010 and voltage comparators 1020 and 1030, a logic component 1040, and a diode voltage clamp 1056. The comparators 1010, 1020, and 1030 are also called comparators A1, A2, and A3 respectively, and the diode voltage clamp 1056 is also called the diode Vclamp. Additionally, the voltage detector 820 includes a resistor 1050 and a capacitor 1052. The resistor 1050 and the capacitor 1052 are also called resistor R1 and capacitor C1.

For the voltage detector 820, the resistor 1050 and capacitor 1052 are directly connected through a node 1054, whose voltage level is clamped by the diode voltage clamp 1056. As shown in FIG. 10, the voltage detector 820 receives the input voltage $V_{in}$ and outputs the detection current $I_d$ to the mode selection component 880. The detection current $I_d$ is mirrored to generate an input current for the current comparator 1010, and the input current is equal to $N \times I_d$.

If the input current $N \times I_d$ is higher than the threshold $I_{ref\_d}$, the current comparator 1010 outputs a signal 1012 that would enable only the QR mode, the QR foldback mode, and the burst mode. If the input current $N \times I_d$ is lower than the threshold $I_{ref\_d}$, the current comparator 1010 outputs the signal 1012 that would enable only the fixed frequency mode, the QR foldback mode, and the burst mode.

Additionally, the mode selection component 880 also receives the feedback voltage $V_{FB}$. The feedback voltage $V_{FB}$ is compared with the threshold $V_{ref\_h}$ by the voltage comparator 1020, and with the threshold $V_{ref\_1}$ by the voltage comparator 1030. Both the voltage comparators 1020 and 1030 send their output signals to the logic component 1040, which in response generates a signal 1042.

If the feedback voltage $V_{FB}$ is higher than the threshold $V_{ref\_h}$, the signal 1042 enables only the QR mode and the fixed frequency mode. If $V_{FB}$ is lower than the threshold $V_{ref\_h}$ but higher than the threshold $V_{ref\_1}$, the signal 1042 would enable only the QR foldback mode. If $V_{FB}$ is lower than the threshold $V_{ref\_1}$, the signal 1042 would enable only the burst mode.

According to an embodiment, the multi-mode controller 810 is further configured as follows.

(a) If both the signals 1012 and 1042 enable the QR mode, the QR mode controller 870 outputs a control signal to the gate driver 882. In response, the gate driver 882 sends to the switch 830 a drive signal, which corresponds to the QR mode. If either the signal 1012 or 1042 does not enable the QR mode, the QR mode controller 870 is not activated and thus the drive signal would not correspond to the QR mode.

(b) If both the signals 1012 and 1042 enable the fixed frequency mode, the fixed frequency mode controller 872 outputs a control signal to the gate driver 882. In response, the gate driver 882 sends to the switch 830 a drive signal, which corresponds to the fixed frequency mode. If either the signal 1012 or 1042 does not enable the fixed frequency mode, the fixed frequency mode controller 872 is not activated and thus the drive signal would not correspond to the fixed frequency mode.

(c) If both the signals 1012 and 1042 enable the QR foldback mode, the fixed frequency mode controller 874 outputs a control signal to the gate driver 882. In response, the gate driver 882 sends to the switch 830 a drive signal, which corresponds to the QR foldback mode. If either the signal 1012 or 1042 does not enable the QR foldback mode, the QR foldback mode controller 874 is not activated and thus the drive signal would not correspond to the QR foldback mode.

(d) If both the signals 1012 and 1042 enable the burst mode, the fixed frequency mode controller 876 outputs a control signal to the gate driver 882. In response, the gate driver 882 sends to the switch 830 a drive signal, which corresponds to the burst mode. If either the signal 1012 or 1042 does not enable the burst mode, the burst mode controller 876 is not activated and thus the drive signal would not correspond to the burst mode.

As discussed above and further emphasized here, FIG. 10 is merely an example, which should not unduly limit the scope of the claims. One of ordinary skill in the art would recognize many variations, alternatives, and modifications. For example, the capacitor 1052 is used to perform the programmable soft start function and/or the filter function. In another example, the capacitor 1052 is removed.

The present invention provides many advantages. Certain embodiments of the present invention significantly reduce the range of variation for the switching frequency. Some embodiments of the present invention significantly reduce the size of power transformers. Certain embodiments of the present invention significantly improve efficiency of power transformers, such as at light loading. Some embodiments of the present invention significantly lower cost of power transformers.

According to certain embodiments, a system with QR control has multiple modes of operation. For example, if the input voltage is higher than a predetermined threshold and the feedback voltage is higher than another predetermined threshold, the system works in the QR mode. In another example, if the input voltage is lower than a predetermined threshold and the feedback voltage is higher than another predetermined threshold, the system works in the fixed frequency mode.

According to some embodiments of the present invention, the input voltage is detected by a voltage detector. For example, the voltage detector includes a voltage divider that outputs a detection voltage that is proportional to the input voltage. In another example, the voltage detector includes a resistor with one terminal receiving the input voltage and the other terminal outputting a detection current. The detection current is proportional to the input voltage.

According to certain embodiments of the present invention, the multi-mode controller uses a pin to receive the detection voltage or the detection current from the voltage detector. For example, based on the received detection voltage or current as well as the received feedback voltage, the multi-mode controller determines the mode of operation for the PWM power conversion system. In another example, the pin for receiving the detection voltage or current can be used also for one or more other functions, such as soft start. In another example, the multi-mode controller includes one or more component to perform protection latch, etc.

According to certain embodiments of the present invention, the multi-mode controller uses a two-dimensional control to determined the mode of operation. For example, the mode of operation is selected based on the feedback voltage and the input voltage as indicated by the detection voltage or the detection current.

According to yet another embodiment of the present invention, a switch-mode power conversion system includes a primary winding configured to receive an input voltage, and a secondary winding coupled to the primary winding and configured to, with one or more other components, generate an output signal. Additionally, the switch-mode power conversion system includes a feedback component configured to receive the output signal and generate a feedback signal based on at least information associated with the output signal, and a voltage detector configured to receive the input voltage and output a detection signal. Moreover, the switch-mode power conversion system includes a mode controller configured to receive the detection signal and the feedback signal and generate a switch signal based on at least information associated with the detection signal and the feedback signal, and a switch configured to receive the switch signal and affect a first current flowing through the primary winding. The mode controller is further configured to process information associated with the detection signal and a first threshold, determine whether the detection signal and the first threshold satisfy a first predetermined criterion, process information associated with the feedback signal and a second threshold, determine whether the feedback signal and the second threshold satisfy a second predetermined criterion, and determine whether an operation mode for the switch-mode power conversion system is a quasi-resonant mode based on at least whether the first predetermined criterion is determined to be satisfied and whether the second predetermined criterion is determined to be satisfied. Also, the switch signal corresponds to the operation mode for the switch-mode power conversion system. For example, the switch-mode power conversion system is implemented according to FIGS. 6, 7, 8, 9, and/or 10.

In another example, the first predetermined criterion is that the detection signal is larger than the first threshold in magnitude, and the second predetermined criterion is that the feedback signal is larger than the second threshold in magnitude. In yet another example, the mode controller is further configured to determine whether the operation mode is a fixed frequency mode based on at least whether the first predetermined criterion is determined to be satisfied and whether the second predetermined criterion is determined to be satisfied.

In yet another example, the mode controller is further configured to process information associated with the feedback signal, the second threshold, and a third threshold, determine whether the feedback signal, the second threshold, and the third threshold satisfy a third predetermined criterion, and determine whether the operation mode is a quasi-resonant foldback mode based on at least whether the third predetermined criterion is determined to be satisfied, the quasi-resonant foldback mode being different from the quasi-resonant mode. In yet another example, the third predetermined criterion is that the feedback signal is smaller than the second threshold and larger than the third threshold in magnitude.

In yet another example, the mode controller is further configured to determine whether the feedback signal and the third threshold satisfy a fourth predetermined criterion, and determine whether the operation mode is a burst mode based on at least whether the fourth predetermined criterion is determined to be satisfied. In yet another example, the fourth predetermined criterion is that the feedback signal is smaller than the third threshold in magnitude.

In yet another example, the switch-mode power conversion system is a pulse-width-modulated power conversion system. In yet another example, the voltage detector includes a first resistor and a second resistor, the first resistor and the second resistor being connected to each other in series, and the detection signal is a voltage signal. In yet another example, the voltage detector includes at least one resistor, the resistor being connected to a diode voltage clamp, and the detection signal is a current signal. In yet another example, the input voltage is a rectified line input voltage, the output signal is an output voltage, and/or the one or more other components include at least one selected from a group consisting of a diode and a capacitor.

According to yet another embodiment of the present invention, a switch-mode power conversion system includes a primary winding configured to receive an input voltage, and a secondary winding coupled to the primary winding and configured to, with one or more other components, generate an output signal. Additionally, the switch-mode power conversion system includes a feedback component configured to receive the output signal and generate a feedback signal based on at least information associated with the output signal, and a voltage detector configured to receive the input voltage and output a detection signal. Moreover, the switch-mode power conversion system includes a first mode controller configured to receive the detection signal and the feedback signal and generate a switch signal based on at least information associated with the detection signal and the feedback signal, and a switch configured to receive the switch signal and affect a first current flowing through the primary winding. The first mode controller includes at least a mode selection component and a quasi-resonant mode controller. The mode selection component is configured to process information associated with the detection signal and a first threshold, determine whether the detection signal and the first threshold satisfy a first predetermined criterion, process information associated with the feedback signal and a second threshold, determine whether the feedback signal and the second threshold satisfy a second predetermined criterion, and determine whether an operation mode for the switch-mode power conversion system is a quasi-resonant mode based on at least whether the first predetermined criterion is determined to be satisfied and whether the second predetermined criterion is determined to be satisfied. Additionally, the mode selection component is further configured to, if the operation mode is determined to be the quasi-resonant mode, send a mode selection signal to the quasi-resonant mode controller to generate the switch signal corresponding to the quasi-resonant mode. For example, the switch-mode power conversion system is implemented according to FIGS. 6, 7, 8, 9, and/or 10.

In another example, the first predetermined criterion is that the detection signal is larger than the first threshold in magnitude, and the second predetermined criterion is that the feedback signal is larger than the second threshold in magnitude. In yet another example, the first mode controller further includes at least a fixed frequency mode controller, and the mode selection component is further configured to determine whether the operation mode is a fixed frequency mode based on at least whether the first predetermined criterion is determined to be satisfied and whether the second predetermined criterion is determined to be satisfied, and if the operation mode is determined to be the fixed frequency mode, send the mode selection signal to the fixed frequency mode controller to generate the switch signal corresponding to the fixed frequency mode.

In yet another example, the first mode controller further includes at least a quasi-resonant foldback mode controller, and the first mode controller is further configured to process information associated with the feedback signal, the second threshold, and a third threshold, determine whether the feedback signal, the second threshold, and the third threshold satisfy a third predetermined criterion, determine whether the operation mode is a quasi-resonant foldback mode based on at least whether the third predetermined criterion is determined to be satisfied, and if the operation mode is determined to be the quasi-resonant foldback mode, send the mode selection signal to the quasi-resonant foldback mode controller to generate the switch signal corresponding to the quasi-resonant foldback mode. The quasi-resonant foldback mode is different from the quasi-resonant mode. In yet another example, the third predetermined criterion is that the feedback signal is smaller than the second threshold and larger than the third threshold in magnitude.

In yet another example, the first mode controller further includes at least a burst mode controller, and the first mode controller is further configured to determine whether the feedback signal and the third threshold satisfy a fourth predetermined criterion, determine whether the operation mode is a burst mode based on at least whether the fourth predetermined criterion is determined to be satisfied, and if the operation mode is determined to be the burst mode, send the mode selection signal to the burst mode controller to generate the switch signal corresponding to the burst mode. In yet another example, the fourth predetermined criterion is that the feedback signal is smaller than the third threshold in magnitude.

According to yet another embodiment of the present invention, a method for determining an operation mode for a switch-mode power conversion system includes receiving an input voltage by a primary winding and a voltage detector, and generating a detection signal by the voltage detector based on at least information associated with the input voltage. Additionally, the method includes generating an output signal based on at least information associated with the input voltage, receiving the output signal by a feedback component, and generating a feedback signal based on at least information associated with the output signal. Moreover, the method includes receiving the detection signal and the feedback signal by a mode controller, generating a switch signal based on at least information associated with the detection signal and the feedback signal, and affecting a first current flowing through the primary winding based on at least information associated with the switch signal. The process for generating a switch signal based on at least information associated with the detection signal and the feedback signal includes processing information associated with the detection signal and a first threshold, determining whether the detection signal and the first threshold satisfy a first predetermined criterion, processing information associated with the feedback signal and a second threshold, determining whether the feedback signal and the second threshold satisfy a second predetermined criterion, and determining whether an operation mode for the switch-mode power conversion system is a quasi-resonant mode based on at least whether the first predetermined criterion is determined to be satisfied and whether the second predetermined criterion is determined to be satisfied. The switch signal corresponds to the operation mode for the switch-mode power conversion system. For example, the method is implemented according to FIGS. 6, 7, 8, 9, and/or 10.

In another example, the first predetermined criterion is that the detection signal is larger than the first threshold in magnitude, and the second predetermined criterion is that the feedback signal is larger than the second threshold in magnitude. In yet another example, the process for generating a switch signal based on at least information associated with the detection signal and the feedback signal includes determining whether the operation mode is a fixed frequency mode based on at least whether the first predetermined criterion is determined to be satisfied and whether the second predetermined criterion is determined to be satisfied.

In yet another example, the process for generating a switch signal based on at least information associated with the detection signal and the feedback signal includes processing information associated with the feedback signal, the second threshold, and a third threshold, determining whether the feedback signal, the second threshold, and the third threshold satisfy a third predetermined criterion, and determining whether the operation mode is a quasi-resonant foldback mode based on at least whether the third predetermined criterion is determined to be satisfied, the quasi-resonant foldback mode being different from the quasi-resonant mode. In yet another example, the third predetermined criterion is that the feedback signal is smaller than the second threshold and larger than the third threshold in magnitude.

In yet another example, the process for generating a switch signal based on at least information associated with the detection signal and the feedback signal includes determining whether the feedback signal and the third threshold satisfy a fourth predetermined criterion, and determining whether the operation mode is a burst mode based on at least whether the fourth predetermined criterion is determined to be satisfied. In yet another example, the fourth predetermined criterion is that the feedback signal is smaller than the third threshold in magnitude.

Many benefits are achieved by way of the present invention over conventional techniques. Certain embodiments of the present invention significantly reduce frequency variations. Some embodiments of the present invention significantly simplify transformer designs.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A switch-mode power conversion system, the system comprising:
a primary winding configured to receive an input voltage;
a secondary winding coupled to the primary winding and configured to, with one or more other components, generate an output signal;
a feedback component configured to receive the output signal and generate a feedback signal based on at least information associated with the output signal;
a voltage detector configured to receive the input voltage and output a detection signal;
a mode controller configured to receive the detection signal and the feedback signal and generate a switch signal based on at least information associated with the detection signal and the feedback signal; and
a switch configured to receive the switch signal and affect a first current flowing through the primary winding;
wherein the mode controller is further configured to:
process information associated with the detection signal and a first threshold;
determine whether the detection signal and the first threshold satisfy a first predetermined criterion;
process information associated with the feedback signal and a second threshold;
determine whether the feedback signal and the second threshold satisfy a second predetermined criterion;
determine whether an operation mode for the switch-mode power conversion system is a quasi-resonant mode based on at least whether the first predetermined criterion is determined to be satisfied and whether the second predetermined criterion is determined to be satisfied;
determine whether the operation mode is a fixed frequency mode based on at least whether the first predetermined criterion is determined to be satisfied and whether the second predetermined criterion is determined to be satisfied;
process information associated with the feedback signal, the second threshold, and a third threshold;
determine whether the feedback signal, the second threshold, and the third threshold satisfy a third predetermined criterion; and
determine whether the operation mode is a quasi-resonant foldback mode based on at least whether the third predetermined criterion is determined to be satisfied, the quasi-resonant foldback mode being different from the quasi-resonant mode;
wherein the switch signal corresponds to the operation mode for the switch-mode power conversion system.

2. The switch-mode power conversion system of claim 1 wherein the first predetermined criterion is that the detection signal is larger than the first threshold in magnitude.

3. The switch-mode power conversion system of claim 1 wherein the second predetermined criterion is that the feedback signal is larger than the second threshold in magnitude.

4. The switch-mode power conversion system of claim 1 wherein the fixed frequency mode is a continuous current mode.

5. The switch-mode power conversion system of claim 1 wherein the third predetermined criterion is that the feedback signal is smaller than the second threshold and larger than the third threshold in magnitude.

6. The switch-mode power conversion system of claim 1 wherein the mode controller is further configured to:
determine whether the feedback signal and the third threshold satisfy a fourth predetermined criterion; and
determine whether the operation mode is a burst mode based on at least whether the fourth predetermined criterion is determined to be satisfied.

7. The switch-mode power conversion system of claim 6 wherein the fourth predetermined criterion is that the feedback signal is smaller than the third threshold in magnitude.

8. The switch-mode power conversion system of claim 1 wherein the switch-mode power conversion system is a pulse-width-modulated power conversion system.

9. The switch-mode power conversion system of claim 1 wherein:
the voltage detector includes a first resistor and a second resistor, the first resistor and the second resistor being connected to each other in series; and
the detection signal is a voltage signal.

10. The switch-mode power conversion system of claim 1 wherein:
the voltage detector includes at least one resistor, the resistor being connected to a diode voltage clamp; and
the detection signal is a current signal.

11. The switch-mode power conversion system of claim 1 wherein the input voltage is a rectified line input voltage.

12. The switch-mode power conversion system of claim 1 wherein the output signal is an output voltage.

13. The switch-mode power conversion system of claim 1 wherein the one or more other components include at least one selected from a group consisting of a diode and a capacitor.

14. A switch-mode power conversion system, the system comprising:
a primary winding configured to receive an input voltage;
a secondary winding coupled to the primary winding and configured to, with one or more other components, generate an output signal;
a feedback component configured to receive the output signal and generate a feedback signal based on at least information associated with the output signal;
a voltage detector configured to receive the input voltage and output a detection signal;
a first mode controller configured to receive the detection signal and the feedback signal and generate a switch signal based on at least information associated with the detection signal and the feedback signal; and
a switch configured to receive the switch signal and affect a first current flowing through the primary winding;
wherein:
the first mode controller includes at least a mode selection component and a quasi-resonant mode controller;
the mode selection component is configured to:
process information associated with the detection signal and a first threshold;
determine whether the detection signal and the first threshold satisfy a first predetermined criterion;
process information associated with the feedback signal and a second threshold;
determine whether the feedback signal and the second threshold satisfy a second predetermined criterion;
determine whether an operation mode for the switch-mode power conversion system is a quasi-resonant mode based on at least whether the first predetermined criterion is determined to be satisfied and whether the second predetermined criterion is determined to be satisfied; and
if the operation mode is determined to be the quasi-resonant mode, send a mode selection signal to the quasi-resonant mode controller to generate the switch signal corresponding to the quasi-resonant mode;

the first mode controller further includes at least a fixed frequency mode controller;
the mode selection component is further configured to:
determine whether the operation mode is a fixed frequency mode based on at least whether the first predetermined criterion is determined to be satisfied and whether the second predetermined criterion is determined to be satisfied; and
if the operation mode is determined to be the fixed frequency mode, send the mode selection signal to the fixed frequency mode controller to generate the switch signal corresponding to the fixed frequency mode;
the first mode controller further includes at least a quasi-resonant foldback mode controller; and
the first mode controller is further configured to:
process information associated with the feedback signal, the second threshold, and a third threshold;
determine whether the feedback signal, the second threshold, and the third threshold satisfy a third predetermined criterion;
determine whether the operation mode is a quasi-resonant foldback mode based on at least whether the third predetermined criterion is determined to be satisfied, the quasi-resonant foldback mode being different from the quasi-resonant mode; and
if the operation mode is determined to be the quasi-resonant foldback mode, send the mode selection signal to the quasi-resonant foldback mode controller to generate the switch signal corresponding to the quasi-resonant foldback mode.

15. The switch-mode power conversion system of claim 14 wherein the first predetermined criterion is that the detection signal is larger than the first threshold in magnitude.

16. The switch-mode power conversion system of claim 14 wherein the second predetermined criterion is that the feedback signal is larger than the second threshold in magnitude.

17. The switch-mode power conversion system of claim 14 wherein the fixed frequency mode is a continuous current mode.

18. The switch-mode power conversion system of claim 14 wherein the third predetermined criterion is that the feedback signal is smaller than the second threshold and larger than the third threshold in magnitude.

19. The switch-mode power conversion system of claim 14 wherein:
the first mode controller further includes at least a burst mode controller; and
the first mode controller is further configured to:
determine whether the feedback signal and the third threshold satisfy a fourth predetermined criterion;
determine whether the operation mode is a burst mode based on at least whether the fourth predetermined criterion is determined to be satisfied; and
if the operation mode is determined to be the burst mode, send the mode selection signal to the burst mode controller to generate the switch signal corresponding to the burst mode.

20. The switch-mode power conversion system of claim 19 wherein the fourth predetermined criterion is that the feedback signal is smaller than the third threshold in magnitude.

21. A method for determining an operation mode for a switch-mode power conversion system, the method comprising:
receiving an input voltage by a primary winding and a voltage detector;

generating a detection signal by the voltage detector based on at least information associated with the input voltage;

generating an output signal based on at least information associated with the input voltage;

receiving the output signal by a feedback component;

generating a feedback signal based on at least information associated with the output signal;

receiving the detection signal and the feedback signal by a mode controller;

generating a switch signal based on at least information associated with the detection signal and the feedback signal; and affecting a first current flowing through the primary winding based on at least information associated with the switch signal;

wherein the process for generating a switch signal based on at least information associated with the detection signal and the feedback signal includes:

processing information associated with the detection signal and a first threshold;

determining whether the detection signal and the first threshold satisfy a first predetermined criterion;

processing information associated with the feedback signal and a second threshold;

determining whether the feedback signal and the second threshold satisfy a second predetermined criterion;

determining whether an operation mode for the switch-mode power conversion system is a quasi-resonant mode based on at least whether the first predetermined criterion is determined to be satisfied and whether the second predetermined criterion is determined to be satisfied;

determining whether the operation mode is a fixed frequency mode based on at least whether the first predetermined criterion is determined to be satisfied and whether the second predetermined criterion is determined to be satisfied;

processing information associated with the feedback signal, the second threshold, and a third threshold;

determining whether the feedback signal, the second threshold, and the third threshold satisfy a third predetermined criterion; and determining whether the operation mode is a quasi-resonant foldback mode based on at least whether the third predetermined criterion is determined to be satisfied, the quasi-resonant foldback mode being different from the quasi-resonant mode;

wherein the switch signal corresponds to the operation mode for the switch-mode power conversion system.

22. The method of claim 21 wherein the first predetermined criterion is that the detection signal is larger than the first threshold in magnitude.

23. The method of claim 21 wherein the second predetermined criterion is that the feedback signal is larger than the second threshold in magnitude.

24. The method of claim 21 wherein the fixed frequency mode is a continuous current mode.

25. The method of claim 21 wherein the third predetermined criterion is that the feedback signal is smaller than the second threshold and larger than the third threshold in magnitude.

26. The method of claim 21 wherein the process for generating a switch signal based on at least information associated with the detection signal and the feedback signal further includes:

determining whether the feedback signal and the third threshold satisfy a fourth predetermined criterion; and determining whether the operation mode is a burst mode based on at least whether the fourth predetermined criterion is determined to be satisfied.

27. The method of claim 26 wherein the fourth predetermined criterion is that the feedback signal is smaller than the third threshold in magnitude.

* * * * *